United States Patent [19]

Thyberg

[11] Patent Number: 5,248,091
[45] Date of Patent: Sep. 28, 1993

[54] OUTER BOOM BREAK-AWAY

[75] Inventor: Michael M. Thyberg, Washburn, N. Dak.

[73] Assignee: Clark Equipment Company

[21] Appl. No.: 858,112

[22] Filed: Mar. 26, 1992

[51] Int. Cl.⁵ .................. B05B 1/20; B05B 15/08
[52] U.S. Cl. .................. 239/168; 239/166; 248/289.3; 248/900; 403/113
[58] Field of Search .............. 239/164, 166, 167, 168, 239/169; 248/289.3, 900; 403/113, 116, 117, 161, 163, 99; 16/319, 374, 375

[56] References Cited

U.S. PATENT DOCUMENTS

| | | |
|---|---|---|
| 4,044,952 | 8/1977 | Williams et al. ............ 239/168 X |
| 4,200,255 | 4/1980 | Schmidt et al. ............ 248/289 |
| 4,288,034 | 9/1981 | Widmer et al. ............ 239/168 |
| 4,372,492 | 2/1983 | Blumenshine ............ 239/168 |
| 4,588,128 | 5/1986 | Broyhill et al. ............ 239/168 |
| 4,634,051 | 1/1987 | Dudley ............ 239/168 |
| 4,646,972 | 3/1987 | McGregor ............ 239/168 |
| 5,000,385 | 3/1991 | Trusty et al. ............ 239/168 |
| 5,029,757 | 7/1991 | Bourgault et al. ............ 239/169 X |

OTHER PUBLICATIONS

Specification Sheet No. GA-1941-1188-10MJ entitled "Summers Field Tested Tough!" distributed by Summers Manufacturing Company, Inc.

*Primary Examiner*—Andres Kashnikow
*Assistant Examiner*—William Grant
*Attorney, Agent, or Firm*—Kinney & Lange

[57] ABSTRACT

A foldable boom assembly including a hinge with inner and outer parts attached to inner and outer boom sections, respectively, permitting relative rotation of the inner and outer boom sections about a pivot axis. The outer end of the outer boom section swings rearwardly about the pivot axis upon contact with a foreign object. After passing the object, the outer boom section automatically returns to its original position. The outer boom section is capable of being folded to a position parallel to the inner boom section. A stop lug is located on one part of the hinge opposite a slot on the other part of the hinge. A movable plate is located on the same part of the hinge as the slot and is attached at a point above the slot such that the force of gravity causes the plate to cover the slot to cause the folding of the boom to be stopped at an intermediate position by contact between the stop lug and the plate. The plate can be moved to expose the slot and permit the lug to pass through the slot so the outer boom section can be moved to a position parallel to the inner boom section.

15 Claims, 3 Drawing Sheets

OUTER BOOM BREAK-AWAY

BACKGROUND OF THE INVENTION

The present invention relates to foldable boom assemblies for machines for spraying, and in particular to an apparatus for permitting positioning of an outer boom section of a foldable boom assembly in at least two positions relative to an inner boom section.

Foldable boom assemblies are used in the agricultural industry for spraying insecticides and herbicides, and are generally attached to farm vehicles.

Many foldable boom assemblies have an outer boom section that "breaks away" and rotates rearward 90° upon impact with a foreign object such as a fence. This prevents damage to the outer boom section as well as the foreign object. The outer boom section desirably can be manually folded 180° to double back on the inner boom section. Then both boom sections can be pivoted to a position alongside the vehicle extending in a direction parallel to the side of the vehicle.

U.S. Pat. No. 4,200,255 (Schmidt et al. patent) shows such a breakaway arrangement where the pivot axis of a hinge between the inner and outer boom sections is inclined such that after the outer boom section has been rotated rearwardly and the foreign object has been passed, the force of gravity automatically moves the outer boom section forward to its original position.

The Schmidt et al. patent represents a major improvement in breakaway foldable boom assemblies but in order to fully fold the outer boom 180° it is necessary for the outer half of the hinge to be raised vertically to allow the outer boom section to be rotated from the 90° rotated position under the breakaway action to the 180° folded position.

SUMMARY OF THE INVENTION

The present invention provides a foldable boom assembly with an outer boom section that both automatically returns to its original position after contact with a foreign object and rotating rearward not substantially more than 90°, and is easily folded 180° for transport.

The apparatus includes a hinge with an inner half that is attached to an inner boom section and an outer half that is attached to the outer boom section. The hinge permits relative rotation of the inner and outer boom sections about a generally upright pivot axis.

A stop lug is located adjacent the hinge on one of the inner and outer boom sections. A slot is formed on the other of the inner and outer boom sections and is aligned with the stop lug. A movable cover plate is located on the same boom section as the slot and is pivotally attached above the slot so that the forces of gravity force the plate to move to a position covering the slot.

The outer boom section rests in an outward position during use and swings or rotates rearward upon contact with a foreign object. The outer boom section will rotate rearward until the stop lug comes into contact with the movable cover plate causing the outer boom section to rest in a stopped position after rotating about 90°. After passing the foreign object, the outer boom section will automatically move back into the outward position.

The movable cover plate can be moved to uncover the slot to permit the stop lug to pass through the slot. The outer boom section can then be folded rearward beyond the stopped position, approximately 180°, to a folded position with the outer boom section substantially parallel to the inner boom section.

DETAILED DESCRIPTION OF THE PREFERRED EMBODIMENTS

Figure 1:
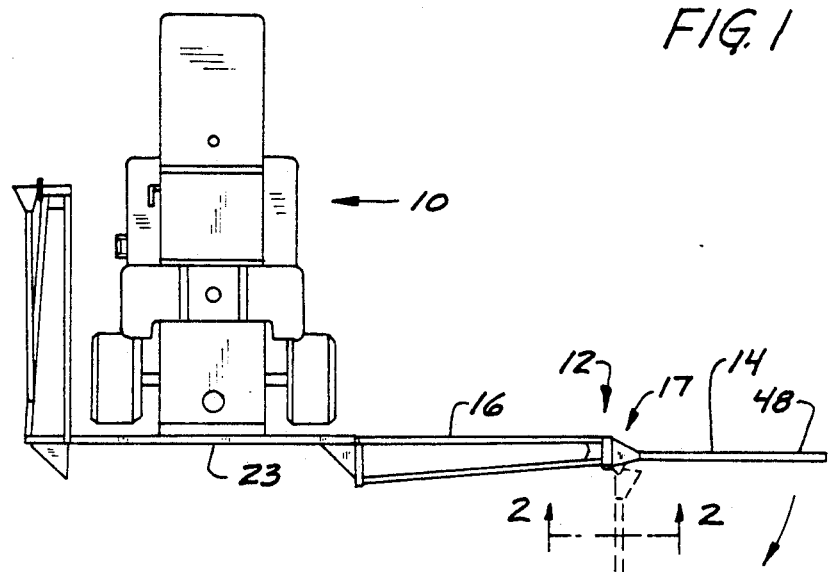
FIG. 1 is a top view of a farm vehicle with the foldable boom assembly of the present invention mounted thereon.

A farm vehicle 10 with the foldable boom assembly 12 of the present invention is shown in FIG. 1. The foldable boom assembly 12 is comprised of an outer boom section 14 and an inner boom section 16 held together by a hinge 17 with an outer hinge part 18 and an inner hinge part 19. A slot 21 is formed on the inner hinge part 19. In a normal working position, the slot 21 is covered by a movable cover plate 20. A stop lug 22 is located on the outer hinge part 18 in vertical alignment with the slot 21.

The foldable boom assembly 12 allows rotational movement of the outer boom section 14 relative to the inner boom section 16, which is attached at its inner end to a support structure 23 mounted on the farm vehicle 10. The outer boom section 14 rests in an outward working position aligned with the inner boom section 16 during operation using a breakaway latch of conventional design. When the outer boom section 14 comes into contact with a foreign object, it breaks away and rotates rearward approximately 90° to a stopped position in which the stop lug 22 is in contact with the plate 20. After the outer boom section 14 passes the foreign object, it returns to the outward working position under the force of gravity. After operation, the outer boom section 14 can be rotated rearward about 180° to a folded position substantially parallel to the inner boom section 16. Both boom sections can then be pivoted to a position alongside the vehicle 10.

Figure 2:
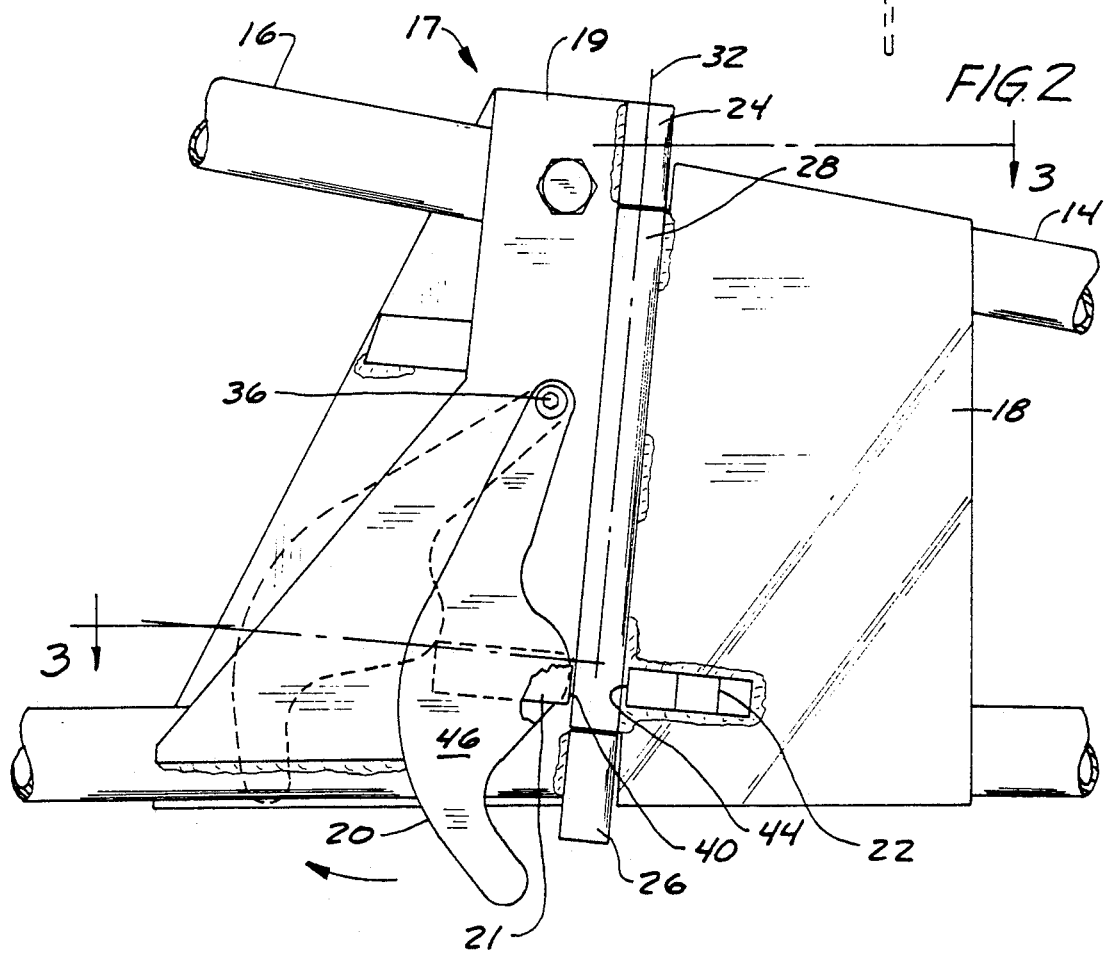
FIG. 2 is a side view of the foldable boom assembly of the present invention taken along the line 2—2 in FIG. 1.
Figure 3:
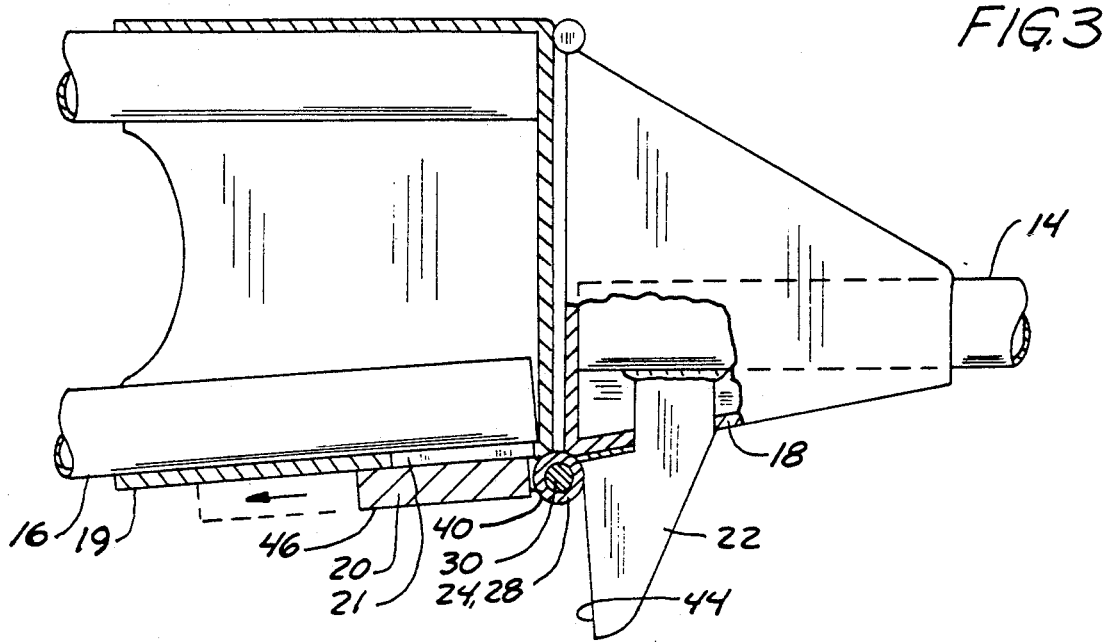
FIG. 3 is a sectional view of the foldable boom assembly of the present invention taken along the line 3—3 in FIG. 2, with the outer boom section in an outward working position.
Figure 4:
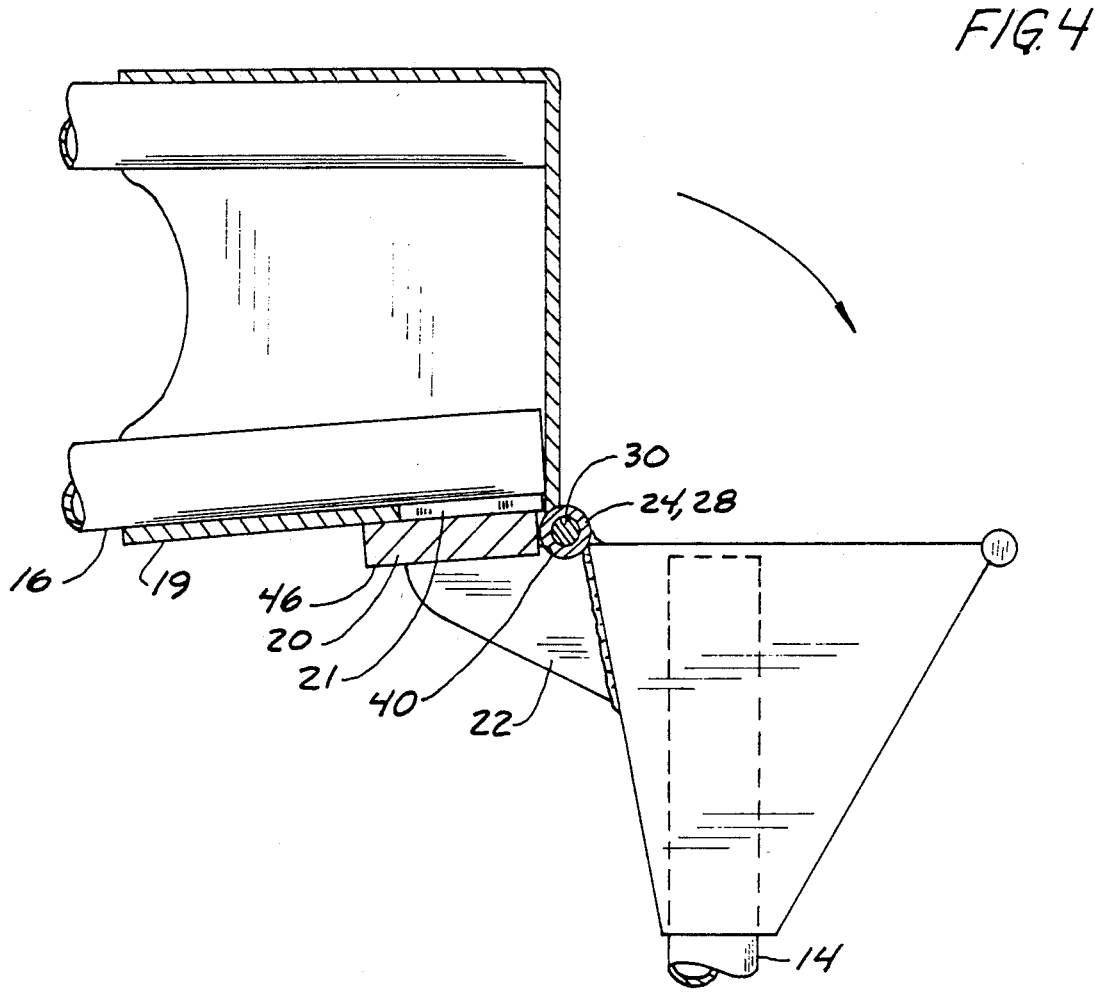
FIG. 4 is a sectional view of the foldable boom assembly of the present invention taken along the line 3—3 in FIG. 2, with the outer boom section in a stopped position.
Figure 5:
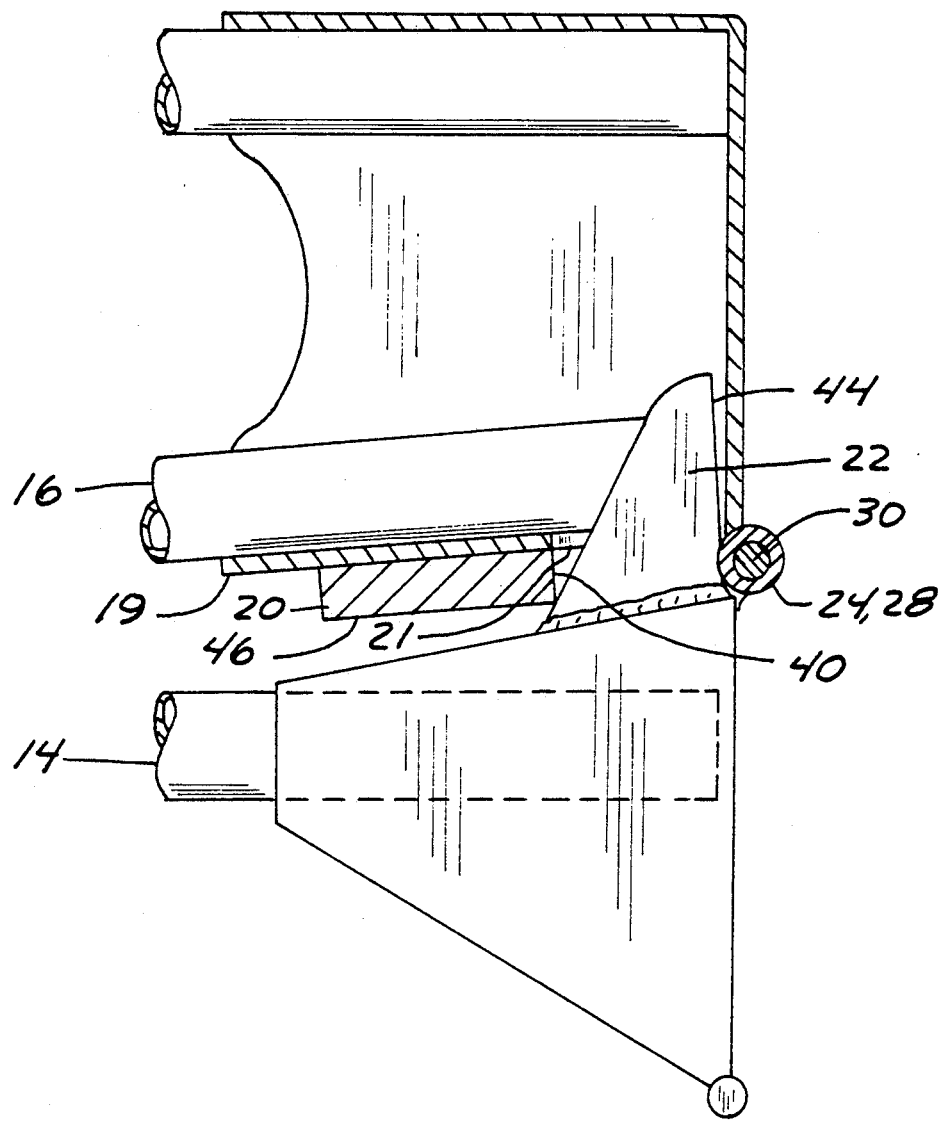
FIG. 5 is a sectional view of the foldable boom assembly of the present invention taken along the line 3—3 in FIG. 2, with the outer boom section in a folded position.

The hinge 17 of the foldable boom assembly 12 is shown in more detail in FIG. 2, where it is shown with the outer boom section 14 in the outward working position. The outer boom section 14 is attached to and supported by the outer hinge part 18 of the hinge 17. The inner hinge part 19 of the hinge 17 is supported at the outer end of the inner boom section 16. The inner hinge part 19 of the hinge 17 includes top and bottom pin bushings 24, 26 while the outer hinge part 18 of the hinge 17 includes a center pin bushing 28 that interfits between the pin bushings 24, 26. A hinge pin 30 is inserted through the pin bushings 24, 26, 28 to form a pivot axis 32. The outer hinge part 18, and therefore the outer boom section 14, is able to rotate about the pivot axis 32 relative to the inner boom section 16.

The movable cover plate 20 is pivotally attached to the inner hinge part 19 of the hinge 17 at a point 36 above the slot 21 and hangs in its natural (gravity urged) position with an edge 40 resting in contact with the center pin bushing 28. The movable cover plate 20, when in this position, covers the slot 21. The movable cover plate 20, although naturally resting in this position under the forces of gravity, is capable of being rotated clockwise to a position in which the slot 21 is exposed or open. This rotational position of the movable cover plate 20 is illustrated by the dotted lines in FIG. 2.

A stop lug 22 is attached to the outer hinge part 18 of the hinge 17 at a position directly opposite the slot 21. The stop lug 22 has a flat edge 44. When the outer boom section 14 is rotated about 90° rearward during normal use, and the movable cover plate 20 is in its natural position covering the slot 21, the flat edge 44 of the stop lug 22 comes into contact with a surface 46 of the movable cover plate 20. The outer boom section 14 is thus prevented from rotating further rearwardly relative to the inner boom section 16 and is in the stopped position.

When the movable cover plate 20 is rotated clockwise about its pivot axis to its rotational position, exposing the slot 21, the stop lug 22 is able to pass through the slot 21. This allows the outer boom section 14 to continue to rotate beyond the stopped position until the outer boom section 14 is folded to a position parallel to and alongside the inner boom section 16. The outer boom section 14 is then in its folded position.

The pivot axis 32 is inclined outwardly in an upward direction. This inclination causes an outer end 48 of the outer boom section 14 to move upward as the outer boom section 14 is rotated rearwardly. This upward movement of the outer end 48 of the outer boom section 14 as it rotates rearwardly provides a force tending to move the outer boom section 14 back to the outward working position. After the outer boom section 14 has passed the foreign object that caused it to breakaway, the outer boom section 14 will, under the force of gravity, automatically return to the outward working position. The pivot axis 32 may also be inclined forwardly in an upward direction, or both outwardly and forwardly, to achieve the same result. Further, the boom section can be spring loaded to return to a working position after breaking away.

The movable cover plate 20 normally prevents the complete folding of the outer boom section 14. However, the movable plate 20 is easily rotated to uncover the slot 21 and permit the stop lug 22 to pass. The complete folding of the outer boom section 14 is therefore easily done and does not require the lifting of the outer boom section 14.

In a first alternative embodiment of the foldable boom assembly 12, the outer boom section 14 is biased such that it automatically returns to the outward working position after passing the foreign object that caused it to break away. The bias can be provided in a variety of ways including the use of a steel spring or a compressed gas spring. When the outer boom section 14 is biased in one of these ways, it is not necessary for the pivot axis 32 to be inclined.

The movable cover plate 20 of the first alternative embodiment is biased in such a way that it automatically returns to a position covering the slot 21. The bias of the movable cover plate 20 can be provided in a variety of ways including the use of a spring hooked between cover plate 21 and its mounting.

Although the present invention has been described with reference to preferred embodiments, workers skilled in the art will recognize that changes may be made in form and detail without departing from the spirit and scope of the invention.

What is claimed is:

1. An apparatus for permitting positioning of an outer boom section of a foldable boom assembly in at least two positions relative to an inner boom section, the apparatus comprising:
   a hinge having an inner part attached to the inner boom section and an outer part attached to the outer boom section for permitting relative rotation of the inner and outer boom sections about a pivot axis;
   a stop lug located on one of the inner and outer boom sections and aligned with a passage formed on the other boom section, the outer boom section being foldable from an outward position where it aligns with the inner boom section and wherein the stop lug is spaced from the passage, to a position folded back upon the inner boom section; and
   a movable plate located on the same boom section as the passage for blocking the passage during use to form a stop for engagement of the stop lug to prevent the outer boom section from rotating rearward past a stopped position, and the movable plate being movable to uncover the passage to permit the stop lug to pass through the passage as the outer boom section continues to be rotated relative to the inner boom section beyond the stopped position.

2. The apparatus according to claim 1 wherein the pivot axis of the hinge is generally upright.

3. The apparatus according to claim 1 wherein the outer boom section rests in the outward position during use and swings rearward upon contact with a foreign object.

4. The apparatus according to claim 1 wherein the movable plate is pivotally attached at a point above the passage in a manner that allows rotation of the movable plate around the point.

5. The apparatus according to claim 1 wherein the movable plate is pivotally attached at a pivot point above the passage, and the movable plate is shaped relative to the pivot point such that the forces of gravity cause the movable plate to pivot to a position blocking the passage.

6. The apparatus according to claim 1 wherein the movable plate is attached at at least one point above the passage such that the forces of gravity cause the movable plate to move to a position blocking the passage.

7. An apparatus for permitting positioning of an outer boom section of a foldable boom assembly in at least two positions relative to an inner boom section, the apparatus comprising:
   a hinge having an inner part attached to the inner boom section and an outer part attached to the outer boom section for permitting relative rotation of the inner and outer boom sections about a pivot axis;
   an opening formed between a top and a bottom of a first of the inner and outer boom sections;
   a stop lug located on a second of the inner and outer boom sections and aligned with the opening, the outer boom section being foldable from an outward position where it aligns with the inner boom section and wherein the stop lug is spaced from the opening, to a position folded back upon the inner boom section; and a movable plate located on the first of the inner and outer boom sections for covering the opening during use to form a stop for engagement of the stop lug to prevent the outer boom section from rotating rearward past a stopped position, and the movable plate being movable to uncover the opening to permit the stop lug to pass through the opening as the outer boom section continues to be rotated relative to the inner boom section beyond the stopped position.

8. The apparatus according to claim 7 wherein the pivot axis of the hinge is generally upright.

9. The apparatus according to claim 7 wherein the outer boom section rests in the outward position during use and swings rearward upon contact with a foreign object.

10. The apparatus according to claim 7 wherein the hinge part on the first of the inner and outer boom sections comprises a generally upright support plate, and the opening is a slot defined through the upright support plate.

11. The apparatus according to claim 10 wherein the movable plate is pivotally attached at a pivot point above the opening, and the movable plate is shaped relative to the pivot point such that the forces of gravity cause the movable plate to pivot to a position covering the opening.

12. The apparatus according to claim 7 wherein the movable plate is attached at at least one point above the opening such that the forces of gravity cause the movable plate to move to a position covering the opening.

13. An apparatus for permitting positioning of an outer boom section of a foldable boom assembly in at least two positions relative to an inner boom section, the apparatus comprising:

a hinge having an inner part attached to the inner boom section and an outer part attached to the outer boom section for permitting relative rotation of the inner and outer boom sections about a pivot axis; and stop means located on the hinge for preventing rotation of the outer boom section rearward beyond a stopped position, and being movable relative to both the inner part and the outer part of the hinge for disabling the stop means and allowing the outer boom section to rotate beyond the stopped position to a folded position relative to the inner boom section.

14. The apparatus according to claim 13 wherein the pivot axis of the hinge is generally upright.

15. The apparatus according to claim 13 wherein the outer boom section rests in an outward position during use and swings rearward upon contact with a foreign object.

* * * * *